United States Patent
Hinks

(10) Patent No.: US 8,653,686 B2
(45) Date of Patent: Feb. 18, 2014

(54) SYSTEM FOR GENERATING ELECTRIC AND MECHANICAL POWER UTILIZING A THERMAL GRADIENT

(76) Inventor: Donald E Hinks, Cape Coral, FL (US)

(*) Notice: Subject to any disclaimer, the term of this patent is extended or adjusted under 35 U.S.C. 154(b) by 0 days.

(21) Appl. No.: 13/312,435

(22) Filed: Dec. 6, 2011

(65) Prior Publication Data

US 2013/0140830 A1    Jun. 6, 2013

(51) Int. Cl.
  *H02P 9/04*    (2006.01)
  *F03B 13/00*   (2006.01)
  *F02B 63/04*   (2006.01)

(52) U.S. Cl.
  USPC ............................................ 290/54; 290/1 R

(58) Field of Classification Search
  USPC ............... 290/1 R, 54; 60/398, 698, 671, 651
  See application file for complete search history.

(56) References Cited

U.S. PATENT DOCUMENTS

| | | | | |
|---|---|---|---|---|
| 3,678,284 | A * | 7/1972 | Peters | 290/1 R |
| 4,039,846 | A * | 8/1977 | Vance | 290/4 R |
| 4,107,928 | A * | 8/1978 | Kelly et al. | 60/650 |
| 4,232,522 | A * | 11/1980 | Steiger | 60/618 |
| 4,383,182 | A * | 5/1983 | Bowley | 290/43 |
| 4,408,127 | A * | 10/1983 | Santos, Sr. | 290/54 |
| 4,466,249 | A * | 8/1984 | Frutschi | 60/648 |
| 4,586,339 | A * | 5/1986 | Reid et al. | 60/641.7 |
| 4,657,290 | A * | 4/1987 | Linden | 290/2 |
| 4,739,182 | A * | 4/1988 | Kenderi | 290/54 |
| 4,742,693 | A * | 5/1988 | Reid et al. | 62/476 |
| 4,768,345 | A * | 9/1988 | Kardas | 60/641.15 |
| 4,835,977 | A * | 6/1989 | Haglund et al. | 62/89 |
| 4,856,281 | A * | 8/1989 | Taylor | 60/641.9 |
| 5,047,654 | A * | 9/1991 | Newman | 290/52 |
| 5,237,827 | A * | 8/1993 | Tchernev | 62/106 |
| 5,272,879 | A * | 12/1993 | Wiggs | 60/676 |
| 6,856,037 | B2 * | 2/2005 | Yazawa et al. | 290/43 |
| 6,906,432 | B2 * | 6/2005 | Belokon et al. | 290/52 |
| 7,299,628 | B2 * | 11/2007 | Buller | 60/398 |
| 7,900,455 | B2 * | 3/2011 | Althaus et al. | 60/727 |
| 8,146,362 | B2 * | 4/2012 | Howard et al. | 60/641.7 |
| 8,209,985 | B2 * | 7/2012 | Takeuchi et al. | 60/653 |
| 2003/0005696 | A1 * | 1/2003 | Wilson | 60/618 |
| 2005/0029903 | A1 * | 2/2005 | Tadayon et al. | 310/314 |
| 2006/0006656 | A1 * | 1/2006 | Smedstad | 290/43 |
| 2008/0022683 | A1 * | 1/2008 | Ohler et al. | 60/641.8 |
| 2010/0175638 | A1 * | 7/2010 | Haase | 123/3 |
| 2010/0205959 | A1 * | 8/2010 | Kasuya et al. | 60/618 |
| 2012/0019009 | A1 * | 1/2012 | Fong et al. | 290/1 R |

* cited by examiner

*Primary Examiner* — Julio Gonzalez
(74) *Attorney, Agent, or Firm* — Daniel Law Offices, P.A.; Jason T. Daniel, Esq

(57) ABSTRACT

A system for generating electric and mechanical power utilizing a thermal gradient includes a thermal gradient producing device in communication with a turbine generator. The system being configured to absorb heat energy from an outside environment, circulate the same through a circulation chamber and convert the heat energy into one or both of a mechanical force and electricity which can be fed back to the system itself or utilized by other devices.

5 Claims, 2 Drawing Sheets

SYSTEM FOR GENERATING ELECTRIC AND MECHANICAL POWER UTILIZING A THERMAL GRADIENT

TECHNICAL FIELD

The present invention relates generally to power generation, and more particularly to a system for utilizing the latent energy of a thermal gradient producing device as a force for generating electric and mechanical power.

BACKGROUND

The statements in this section merely provide background information related to the present disclosure and may not constitute prior art.

As fossil fuels and other natural resources become scarce, communities across the globe are looking for power sources which will provide a more abundant form of generating electricity.

One common method uses solar power cells to capture energy from the sun which can be converted into electricity and stored in batteries. However, these systems can not efficiently operate at times when sunshine is not plentiful, such as at night or during adverse weather conditions. Other known systems include windmills and water propelled turbines which use the mechanical force of air or water to spin an electric generator which creates electricity. Although more efficient than solar panels, these mechanical generators can only operate when natural conditions (i.e. wind and water flow) are at sufficient levels to spin the generator. Therefore, these systems can not be relied upon to produce consistent electricity at all times and weather conditions.

Although typically utilized as a means for conditioning air, thermal gradient producing devices, such as conventional heat pumps, for example, act to absorb heat energy from an endothermic side (e.g., evaporator) and release the heat energy to an exothermic side (e.g., condenser). These devices typically require motorized fans and/or pumps to remove this heat energy and release it into the surrounding environment. To this end, these devices are doubly inefficient, as they use a first type of energy to waste a second type of energy.

Accordingly, it would be beneficial to provide a system for utilizing the heat from a highly efficient thermal gradient producing device to generate electricity. It would also be beneficial to provide a system for utilizing the heat from a highly efficient thermal gradient producing device to provide mechanical power capable of providing propulsion to a vehicle.

SUMMARY OF THE INVENTION

The present invention is directed to a system for generating electric and mechanical power utilizing a thermal gradient. One embodiment of the present invention can include a thermal gradient producing device in communication with a turbine generator. The system being configured to absorb heat energy from an outside environment and convert the heat energy into one of a mechanical force and electricity which can be fed back to the system itself or utilized by other devices.

Another embodiment of the present invention can include a turbine generator having an air motor and an electric generator.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

Figure 1:
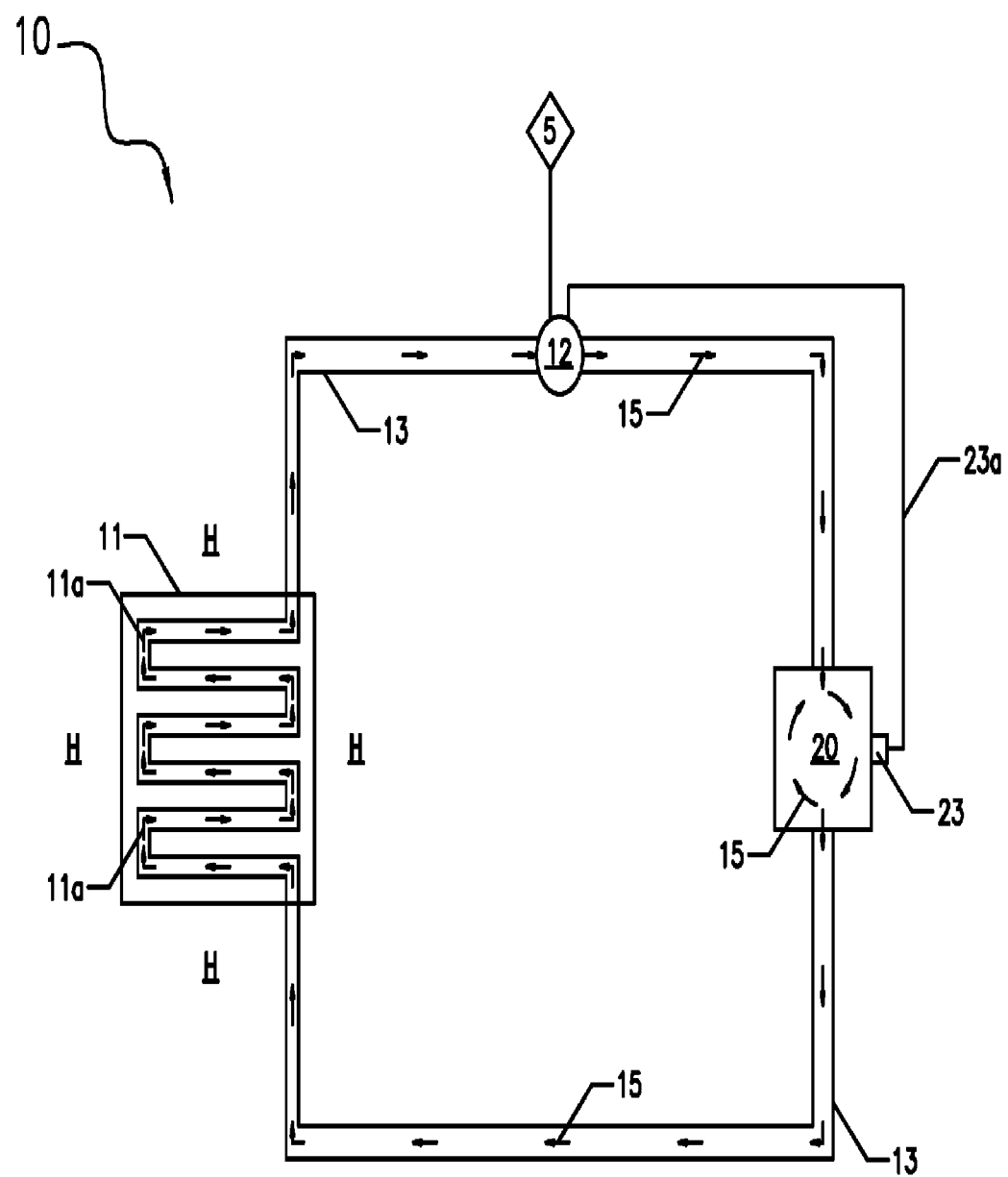
FIG. 1 is a front view of a system for generating electric and mechanical power utilizing a thermal gradient that is useful for understanding the inventive concepts disclosed herein.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Although described below as utilizing specific components, one of skill in the art will recognize that any number of known components can be utilized to create a sustainable thermal gradient producing device capable of absorbing, compressing and releasing latent heat energy. Moreover, it is known that it takes 1BTU per 1° temperature rise, and that the temperature at which a liquid boils and turns to vapor depends on ambient pressure. Thus at atmosphere 1 (normal atmospheric pressure), water boils at 100° C., but at a reduced pressure of 0.1 atmosphere, water boils at only 46° C. Conversely, water vapor having a temperature of 50° C. at 0.1 atmosphere can be condensed and thereby converted back to liquid simply by increasing the pressure. As such, in passing from a liquid phase to a vapor phase, every liquid absorbs latent heat (approximately 1000 BTU's) and then subsequently gives off this latent heat on condensing. In modern thermal gradient producing devices such as a conventional a/c or heat pump system, for example, use is made of a refrigerant (such as Freon®) with a low boiling point.

As described above, traditional thermal gradient producing devices, such as heat pump systems, for example, utilize condensers having a fan and a series of coils configured to remove heat energy from a circulation chamber. However, the inventor has discovered that by replacing a traditional condenser with a highly efficient turbine generator, it is possible to provide the same cooling effect (i.e., removing the latent heat energy) from the system, while simultaneously generating mechanical and electrical power. Moreover, by utilizing a turbine generator, the system described herein does not require additional power to remove the heat energy.

As described herein, the power output (PO) provided by a system for generating electricity from a thermal gradient can be defined by the equation:

$$PO = [GCC - PC + SER] \times [TGE]$$

wherein GCC is defined as the gross cooling capacity of the thermal gradient producing device (i.e., the latent heat in the form of BTU's absorbed into the refrigerant of the circulation system); PC is defined as the power required to operate the thermal producing device; SER is defined as the sensible heat energy recovered by the compressor, (typically 60% or more of the PC); and TGE represents the efficiency of the turbine generator.

To this end, a system, as described herein can act to produce electricity which can be fed back to the compressor and/or other system components in order to augment the power requirements of these components. Moreover, when PO>[GCC−PC+SER]×[TGE], it becomes possible for the system to produce an electrical output that is greater than the electrical input supplied to the compressor, owing to the operation of the turbine generator which converts the heat and mechanical force of the circulating refrigerant into electricity. Such a feature can be accomplished, for example, by utilizing components having a particularly high energy efficiency and low power consumption. Accordingly, the additional power generated by the system can be used to power external devices, thus allowing the herein described system to operate as a sustainable platform.

With respect to this invention and the embodiments outlined below, it is noted that each embodiment complies in full with the laws of thermodynamics, and in particular the Second Law of Thermodynamics. To this end, the operation of the system is based on the availability of kinetic energy in the form of excited matter, and all matter with a kinetic energy above zero kelvin emits black body radiation. Hence as the system remains running, the kinetic energy needed to operate the system will eventually decay to entropy in the form of black body radiation. However, so long as there is matter with sufficient kinetic energy for the system to efficiently absorb, the system can continue to provide potential energy for general use, without other power sources. Accordingly, the inventive concepts disclosed herein operate in a similar theory to other natural energy conversion techniques (i.e. solar, wind, etc.,) in the sense that one form of available energy is transformed into electrical power or mechanical energy.

FIG. 1 illustrates one embodiment of a system for generating electric and mechanical power utilizing a thermal gradient 10, that is useful for understanding the embodiments disclosed herein. As shown, system 10 can include an energy absorption unit (EAU) 11, a compressor 12, a circulation chamber 13 and a turbine generator 20.

The EAU 11, according to one embodiment can include a plurality of coils 11a having a large surface area where warm outside air H can interact with the cold low pressure vapor refrigerant 15 supplied by the circulation chamber 13 in order to allow the refrigerant to absorb heat like a sponge. During this process, energy in the form of heat is absorbed by the refrigerant 15 as an endothermic process. Although illustrated as a single coil this is for illustrative purposes only, as one of skill in the art will recognize that any number of coils and/or coil sizes can be utilized to achieve the endothermic process. Although not illustrated, any number of optional fans can be included into the EAU 11 in order to expedite the endothermic process.

The compressor 12 acts as a refrigerant pump for circulating and compressing the warm refrigerant gas 15 supplied from the EAU 11 into a super heated pressurized liquid. During this compression process, additional heat in the form of sensible energy is added to the refrigerant 15. The compressor is connected to a conventional power source 5 such as a battery or electric grid, and operates on electricity and the required amount fluctuates depending on the temperature difference between the refrigerant entering both the EAU 11 and the generator 12. In one preferred embodiment, the compressor 12 will include a conventional scroll compressor having a high energy efficiency rating. However, any number of known compressors can be utilized herein. Moreover, a conventional thermostatic expansion valve and/or volume valve (not illustrated) can be included in order to control the amount of refrigerant flow into the turbine generator 20.

The circulation chamber 13 can act to circulate pressurized refrigerant 15, such as Freon®, for example, in a secure manner. As shown, the circulation chamber can be connected to each of the EAU 11, compressor 12 and generator 20. In one preferred embodiment, the circulation chamber 13 can include one or more pieces of elongated copper tubes configured to withstand extreme temperature and pressure variations while containing the refrigerant 15 in a sealed and secure manner. Of course, many other known materials can also be utilized.

Figure 2:
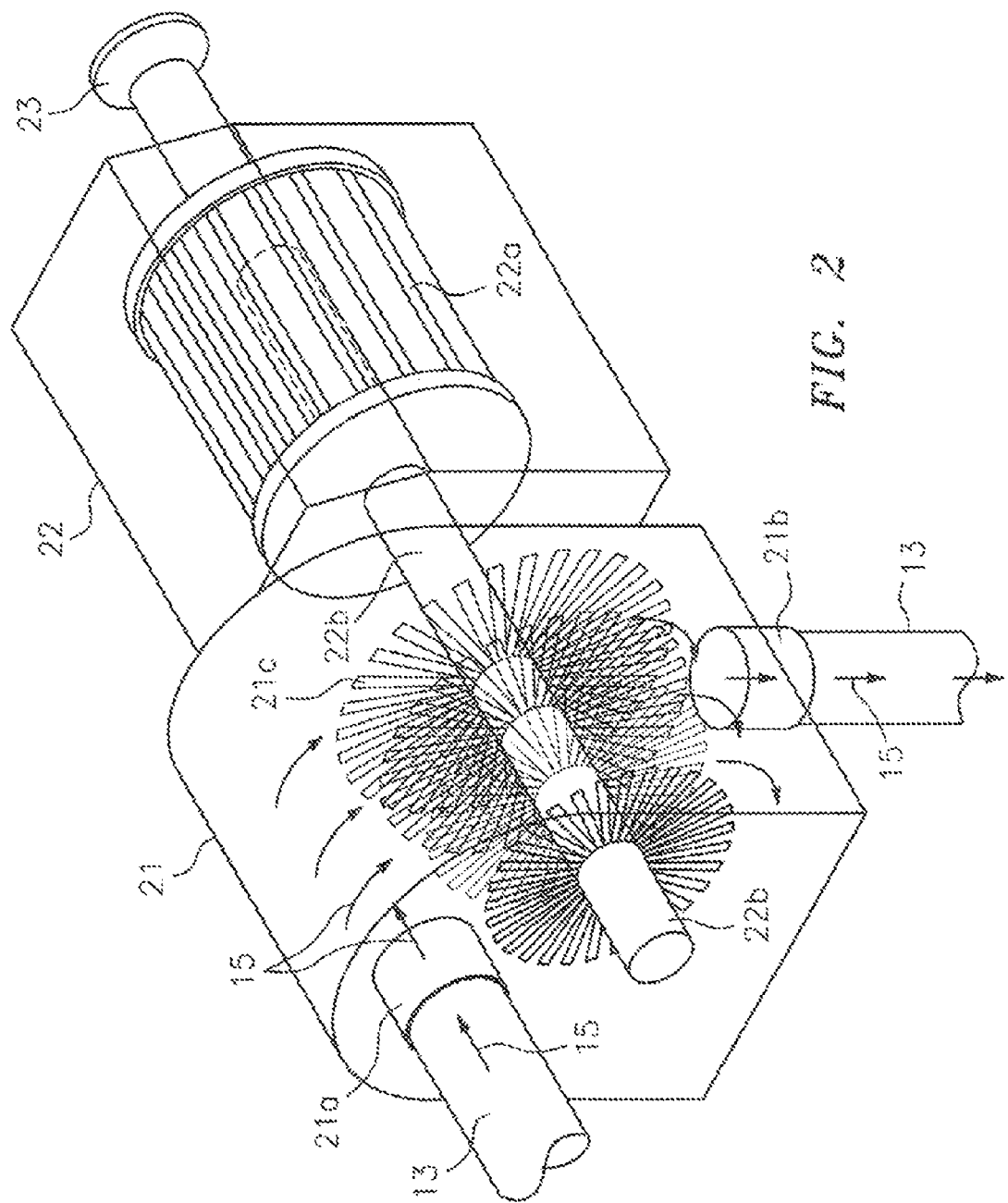
FIG. 2 is a frontal view of a turbine generator for use with the system for generating electric and mechanical power utilizing a thermal gradient, according to one embodiment.

The turbine generator 20 can act to convert the sensible and latent heat energy contained within the refrigerant 15 into usable mechanical and/or electrical power. As shown in FIG. 2, one embodiment of a turbine generator 20 can include an air motor 21 and an electrical generator 22.

The air motor 21 can act to transform the supplied sensible heat and latent heat into mechanical energy. Accordingly, one embodiment of an air motor 21 can include a sealed body having a circulation chamber input 21a, a circulation chamber output 21b and a plurality of blades 21c connected to a rotor 22b. Although described above as including blades, one of skill in the art will recognize that any number of known devices such as turbine wheels, and/or screw expanders, for example can be used instead of or conjunction with the turbine blades 21c. The electrical generator 22 can act to transform the supplied mechanical energy into electric energy. Accordingly, one embodiment of an electrical generator can preferably includes a stator 22a, rotor 22b, and/or additional components configured to generate electrical power using mechanical power. The output 23 of the generator 22 can be connected back to the system components or to one or more external components via conventional cables 23a. In one preferred embodiment, the turbine generator 20 can include a single integrated unit having an overall efficiency of greater than 70 percent.

Although illustrated above as including both an air motor and an electric generator, the invention is not so limiting. To this end, a turbine generator, as defined herein can include both an air motor and electric generator or can include only an air motor capable of generating a mechanical force and providing the same to any number of external items. Moreover, one of skill in the art will recognize that the air motor 21 can include any number of conventional air motors including air piston motors, capable of converting heat to mechanical energy as described above. Likewise, any number of conventional electric generators capable of converting mechanical energy into electricity can also be utilized. As air motors and electric generators are well and truly known in the art, no further description will be provided herein.

In operation, the air motor 21 of the generator 20 can receive the pressurized super heated refrigerant 15 from the compressor 12 and utilize the same as a mechanical force to spin the internal turbine blades 21c which, in turn can operate the electric generator 22 in a known manner. Owing to the aerodynamics of air motors, upon encountering the turbine blades 21c, the refrigerant 15 will release the mechanical heat energy in the form of stored BTUs and return to a cool low pressure vapor state, which under low pressure can then be fed back into the EAU. Accordingly, the turbine generator 20 can act to remove the heat energy stored within the refrigerant 15 and utilize this energy to produce useable power.

In order to further illustrate the operation of the system described herein, one non-limiting example will be made to specific components. One of skill in the art will recognize that the following example is for illustrative purposes only, and will further recognize that the system can include any number of other known components for achieving the described results. Accordingly, in one embodiment, the EAU can comprise a 17.5 kW (5 ton) heat pump evaporator model KHA060s4B commercially available from Lenox INC®. To this end, the above identified unit is capable of providing a gross cooling capacity (GCC) of 16.3 kW or 55000 BTUs to the turbine generator. The power consumption (PC) of this unit is 3.72 kW or 12,725 BTUs (removing auxiliary components such as fans and the like). As described above, it is preferred that turbine generator include an efficiency (i.e., power output–power input) of at least 70% (TGE). Accordingly, when plugged into the equation PO=[GCC−PC+SER]×[TGE], you have [16.3 kW−3.7kW+2.6kW]×[70%] resulting in a power output (PO) of 10.7 kW.

As can be seen from the above example, a system for generating electric and mechanical power utilizing a thermal gradient is capable of generating an overall electrical output (10.7 kW) that is greater than an electrical input supplied to the system (3.72 kW), owing to the utilization of a highly efficient turbine generator to transition the mechanical and heat energy of the pressurized refrigerant into useable electric power. To this end, when utilizing components having a higher efficiency rating, and a lower power consumption, the system is capable of generating even greater amounts of useable power.

Accordingly, by converting the heat energy that would typically be expelled, the system for producing mechanical and electrical power from a thermal gradient described herein, can produce useable mechanical and electric power which can be fed back to the system itself and/or other external components. Moreover, as the above described system does not depend on weather conditions or solar energy, it is possible to produce this power for extremely long durations without interruption.

Although outside the scope of this document, those of skill in the art will recognize that applications for the system of generating electric and mechanical power utilizing a thermal gradient described above are virtually endless. For example, the system 10 can be utilized in a stand alone manner to produce useable electricity. Additionally, the system 10 can be utilized as (or in conjunction with) a traditional air conditioning/heat pump system capable of achieving a power efficiency rating not possible with conventional systems. Finally, the system 10 can be utilized as a propulsion system for vehicles such as cars, trains, ships, planes and the like. In this regard, the system 10 can act to produce electricity for an electric motor which then propel the vehicle, or the electric generator 22 can be removed, and the mechanical force produced by the air motor 21 can provide propulsion.

Accordingly, by transferring heat into mechanical energy, the system of generating electric and mechanical power utilizing a thermal gradient described above can effectively act to reduce greenhouse gasses and potentially act to lower the amount of global warming to our environment.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system for generating electric and mechanical power utilizing a thermal gradient, said system comprising:
   a closed loop thermal gradient producing device that utilizes outside air to impart a heat energy into a refrigerant, said thermal gradient producing device consisting of
      a circulation chamber containing the pressurized refrigerant,
      an energy absorption unit having a plurality of coils that are exposed to the outside air for circulating the refrigerant, said absorption unit being configured to allow the refrigerant to absorb heat from the outside air as an endothermic process, and
      a compressor configured to receive an electrical input, and to circulate and recompress the refrigerant within the circulation chamber,
   a turbine generator having an efficiency of greater than 70%, that is in communication with the thermal gradient producing device, said turbine generator being configured to remove the heat energy from the thermal gradient producing device and convert the same into an electrical output; and
   an electrical feedback unit configured to augment a power requirement of the thermal gradient producing device by supplying the electrical output generated by the turbine generator to at least one of the compressor and an outside device.

2. The system of claim 1, wherein said compressor includes a scroll compressor.

3. The system of claim 1, wherein said turbine generator further includes:
   an air motor having at least one of a plurality of turbine blades and a plurality of turbine wheels, each configured to receive the refrigerant and generate a mechanical force.

4. The system of claim 3, wherein said turbine generator further includes:
   an electric generator in communication with the air motor, said electric generator being configured to convert the mechanical force into electricity.

5. The system of claim 1, wherein said system satisfies the equation:

$$PO > [GCC - PC + SER] \times [TGE].$$

* * * * *